United States Patent
Namuduri et al.

(10) Patent No.: US 6,279,701 B1
(45) Date of Patent: Aug. 28, 2001

(54) MAGNETORHEOLOGICAL FLUID DAMPER WITH MULTIPLE ANNULAR FLOW GAPS

(75) Inventors: Chandra Sekhar Namuduri, Sterling Heights; Alexander Apostolos Alexandridis, Orchard Lake Village; Joseph Madak, Madison Heights; David S. Rule, Orchard Lake, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/394,726

(22) Filed: Sep. 13, 1999

(51) Int. Cl.⁷ .......................................... F16F 9/53
(52) U.S. Cl. ............................................ 188/267.2
(58) Field of Search ............................. 188/267, 267.1, 188/267.2

(56) References Cited

U.S. PATENT DOCUMENTS

| | | |
|---|---|---|
| 2,661,596 | 12/1953 | Winslow . |
| 3,207,269 | 9/1965 | Klass . |
| 5,014,829 * | 5/1991 | Hare, Sr. .............. 188/267 |
| 5,076,403 * | 12/1991 | Mtsui .................... 188/267 |
| 5,277,281 * | 1/1994 | Carlson et al. ........ 188/267 |
| 5,398,917 * | 3/1995 | Carlson et al. ........ 188/267 |
| 5,489,009 * | 2/1996 | Kawamata et al. .... 188/267 |
| 5,632,361 | 5/1997 | Wulff et al. . |
| 5,878,851 | 3/1999 | Carlson et al. . |
| 6,029,783 * | 2/2000 | Wirtthlin et al. ...... 188/267.1 |
| 6,095,486 * | 8/2000 | Ivers et al. ............ 188/267 |

FOREIGN PATENT DOCUMENTS

| | | |
|---|---|---|
| 6-58393 * | 1/1994 | (JP) . |
| 98/00653 | 1/1998 | (WO) . |

OTHER PUBLICATIONS

"Magnetorheological Effect As A Base Of New Devices and Technologies", W.I. Kordonsky, Journal of Magnetism Materials, 122 (1993) 395–398.

"MagneShock™ Scores First Race Win", Carrera Racing Shocks, Jun., 1999.

* cited by examiner

Primary Examiner—Robert J. Oberleitner
Assistant Examiner—Robert A Siconolfi
(74) Attorney, Agent, or Firm—Robert M. Sigler

(57) ABSTRACT

An improved magnetorheological fluid damper is provided which closely approximates ideal performance requirements by providing an increased turn-up ratio and improving the linearity of damping force response. The MR damper includes a plurality of concentric annular flow gaps formed between concentrically mounted flux rings positioned on a piston core. By utilizing multiple flow gaps, the present damper increases the overall magnetorheological damping affect thereby creating a higher damping force and an increased tun-up ratio for a given piston size. Alternatively, the present multiple flow gap design permits a given damping force requirement to be achieved with a piston having a significantly reduced length thereby permitting a longer piston stroke. Also, multiple flow gaps permit greater design optimization for controlling damping force linearity.

17 Claims, 3 Drawing Sheets

MAGNETORHEOLOGICAL FLUID DAMPER WITH MULTIPLE ANNULAR FLOW GAPS

TECHNICAL FIELD

The present invention relates generally to damping devices used in controlled damping applications such as semi-active vehicle suspension systems. More particularly, the present invention relates to high performance controlled damping devices using magnetorheological (MR) fluid.

BACKGROUND OF THE INVENTION

Magnetorheological fluids that comprise suspensions of magnetic particles such as iron or iron alloys in a fluid medium are well known. The flow characteristics of these fluids can change by several orders of magnitude within milliseconds when subjected to a suitable magnetic field due to suspension of the particles. The ferromagnetic particles remain suspended under the influence of magnetic fields and applied forces. Such magnetorheological fluids have been found to have desirable electro-magnetomechanical interactive properties for advantageous use in a variety of magnetorheological (MR) damping devices, such as rotary devices including brakes and clutches, and linear-acting devices for damping linear motion or for providing controllable dissipative forces along the damper's axis.

High performance controlled damping applications, such as those used in passenger vehicle suspension systems, preferably provide a relatively low damping force at low speeds for comfort, and provide relatively high damping force at higher speeds for safe handling of the vehicle. Thus, continuously variable real-time damping (CV-RTD) actuators have become increasingly popular. The damping performance of a MR fluid based CV-RTD is largely dependent on the force-velocity characteristics of the damper. FIG. 1 illustrates the optimum force-velocity characteristics of a damper used in automotive applications. The slope of the off-state force-velocity curve should be as low as possible for a smooth ride, with a desirable value of approximately 600 N-s/m. The on-state force-velocity curve preferably has an initial slope in the range of 5–30 kN-s/m up to a velocity of 0.1 to 0.4 m/s and a final slope similar to that in the off-state. The desirable maximum on-force should be limited to a suitable value (e.g., 4500 N) at 2 m/s. The ratio of the damping force when the damper is in the on-state (on-force) to the damping force when the damper is in the off-state (off-force) at a given velocity is known as the turn-up ratio. It is desirable to have a turn-up ratio of at least 3 to 6 at a velocity of 1 m/s for good control of the vehicle chassis dynamics.

FIG. 2 shows a known monotube MR damper 10 having a piston 12 sliding within a hollow tube 14 filled with MR fluid. The piston 12 is attached to a hollow rod 18 that slides within a sealed bearing 20 at one end of the body of the damper 10. The piston 12 contains a coil 22 carrying a variable current, thus generating a variable magnetic field across a flow gap 24 between an inner core 26 and an outer shell or flux ring 28 of the piston 12. A bearing 30 having relatively low friction is disposed between the flux ring 28 and the tube 14. The flux ring 28 and the inner core 26 of the piston 12 are held in place by spoked end plates 32. Terminals 34 of the coil 22 extend through the hollow rod 18 and are provided with suitable insulation for connection to a source of electricity. One end portion 36 of the tube 14 is filled with inert gas which is separated from the MR fluid by a floating piston 38. The floating piston 38 and inert gas accommodate the varying rod volume during movement of the piston. U.S. Pat. No. 5,277,281 discloses a similar MR damper.

FIG. 3 illustrates the force-velocity characteristics of the type of MR damper disclosed in FIG. 2. Clearly, in comparison to the preferred curves of FIG. 1, improvements in the force-velocity characteristics of conventional MR dampers are desirable. Although the above-described conventional MR dampers may perform adequately is certain applications, these devices do not achieve the required turn-up ratio and substantially stiction free performance near zero velocity for realistic automotive applications. Conventional monotube dampers do not provide sufficient tuning capability to effectively control the damping characteristics as represented, for example, by the slope of the force-velocity curves. Also, conventional dampers have an unnecessarily long length for a given performance.

Therefore, there is a need for a more compact MR damper capable of more effectively and controllably damping motion.

SUMMARY OF THE INVENTION

It is an object of the present invention, therefore, to overcome the disadvantages of the prior art and to provide a magnetorheological (MR) fluid damper capable of approximating ideal performance requirements by effectively and predictably providing a desired damping effect, while minimizing the damper size.

This and other objects are achieved by providing a damper comprising a cylinder containing a magnetorheological fluid and a piston assembly slidably mounted for reciprocal movement in the cylinder to form a first chamber positioned on one side of the piston assembly and a second chamber positioned on an opposite side of the piston assembly. The piston assembly includes a plurality of substantially annular flow gaps positioned concentrically to one another wherein each flow gap is formed between opposing surfaces of magnetic material. The piston assembly further includes a magnet assembly adapted to generate a magnetic field extending through the plurality of substantially annular flow gaps to cause magnetorheological fluid flowing through the plurality of substantially annular flow gaps to experience a magnetorheological effect affecting the flow of the magnetorheological fluid through the plurality of substantially annular flow gaps. The plurality of substantially annular flow gaps may include three substantially annular flow gaps. The piston assembly may further include a plurality of annular flux rings positioned concentrically to form the plurality of substantially annular flow gaps. The damper may also include a first end plate secured to one end of the piston assembly and a second end plate secured to a second end of the piston assembly. The plates are formed of a nonmagnetic material and include radial extensions connected to the plurality of annular flux rings. Each of the radial extensions preferably includes grooves for receiving the plurality of flux rings. A central portion of each of the flux rings may include a magnetic flux barrier formed of a non-magnetic material to prevent shunting. The piston assembly may further include a piston bearing mounted on the assembly and positioned axially along the assembly entirely between an axial center of the assembly and one of the first and the second chambers. The piston assembly may further include a piston core and a rod connected to the first end plate. The first end plate preferably extends axially between the rod and the piston core to isolate and position the rod a spaced axial distance from the piston core while covering an entire axial end face of the piston core.

DETAILED DESCRIPTION OF THE PREFERRED EMBODIMENT

Figure 4:
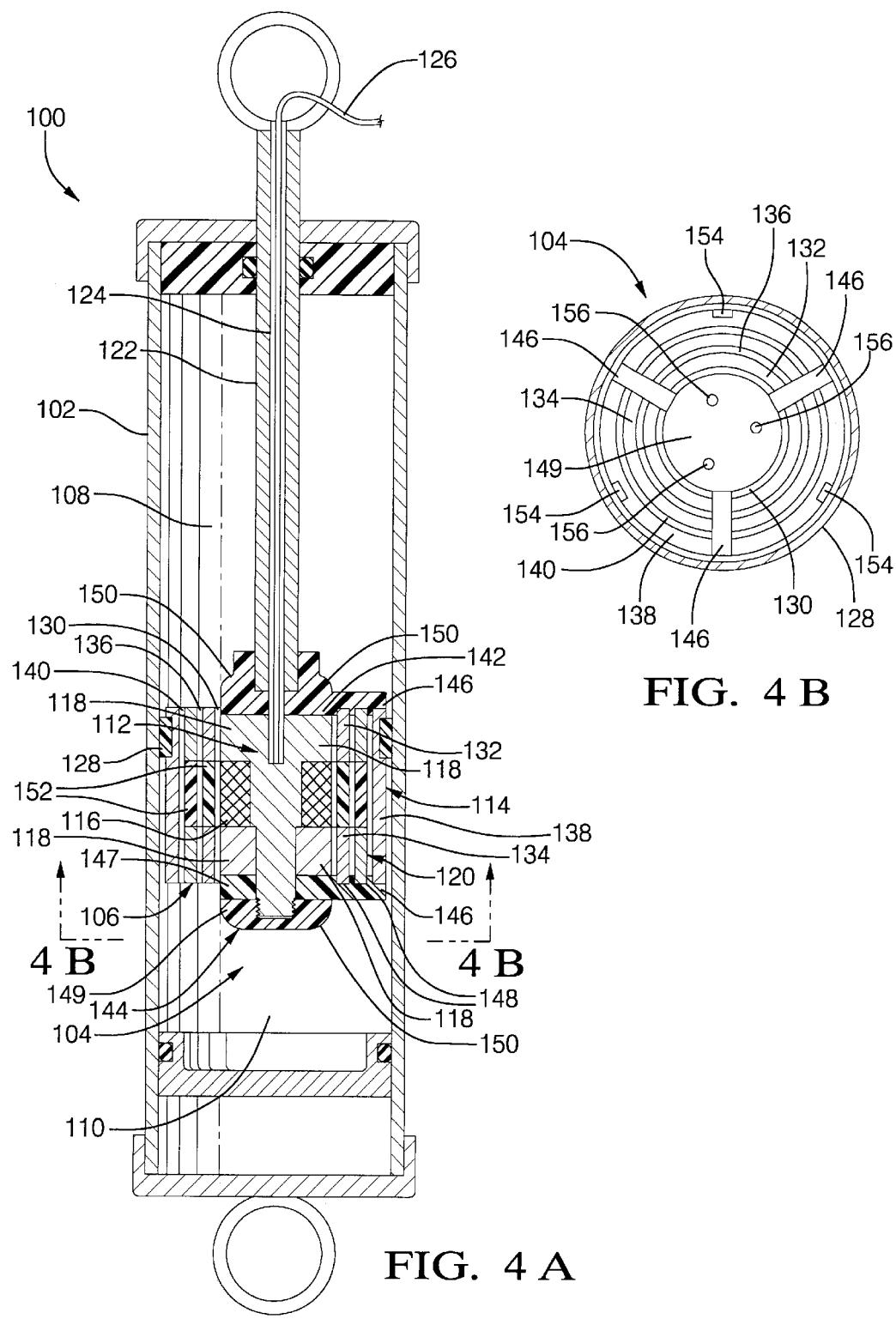
FIG. 4A is a cross-sectional side view of the MR damper of the present invention including multiple flow gaps.
FIG. 4B is a end view of the piston assembly of the MR damper of FIG. 4A.

Referring to FIGS. 4A and 4B, there is shown the magnetorheological fluid damper of the present invention indicated generally at 100 which is designed to effectively enhance damping performance over an extended dynamic range by achieving an increased tun-up ratio while permitting effective tuning of the force-velocity characteristics. Damper 100 includes a cylinder 102 containing magnetorheological fluid, a piston assembly 104 slidably mounted for reciprocal movement in cylinder 102 and a plurality of annular flow gaps 106 for effectively increasing a turn-up ratio for a piston assembly of a given length or permitting a smaller piston length for a given turn-up ratio. The phrase "flow gap" is used to refer to a fluid flow passage through a damper piston through which fluid is forced to flow by axial movement of the piston within the damper so as to generate a damping force.

Referring to FIG. 4A, piston assembly 104 divides cylinder 102 into a first chamber 108 positioned on one side of piston assembly 104 and a second chamber 110 positioned on an opposite side of piston assembly 104. Piston assembly 104 includes a piston core 112 and a magnet assembly 114. Magnet assembly 114 includes a coil 116 mounted on a central portion of piston core 112, flux pole pieces 118 formed by piston core 112 on both sides of coil 116 and a plurality of annular flux rings 120 extending around the circumference of piston core 112. Piston assembly 104 also includes the plurality of substantially annular flow gaps 106 positioned between two flux rings or a flux ring and piston core 112. Each of the plurality of substantially annular flow gaps 106 extends axially through piston assembly 104 so as to pennit fluid communication between first chamber 108 and second chamber 110. Magnetorheological damper 100 also includes a cylindrical rod 122 operatively connected to piston assembly 104 for transmitting axial forces to piston assembly 104. Rod 122 also includes a central bore 124 containing electrical leads 126 for delivering electrical power to coil 116. A piston bearing 128 is mounted on an outer annular surface of piston assembly 104 for permitting smooth sliding contact along cylinder 102 while creating a fluidic seal between first chamber 108 and second chamber 110.

Figure 3:
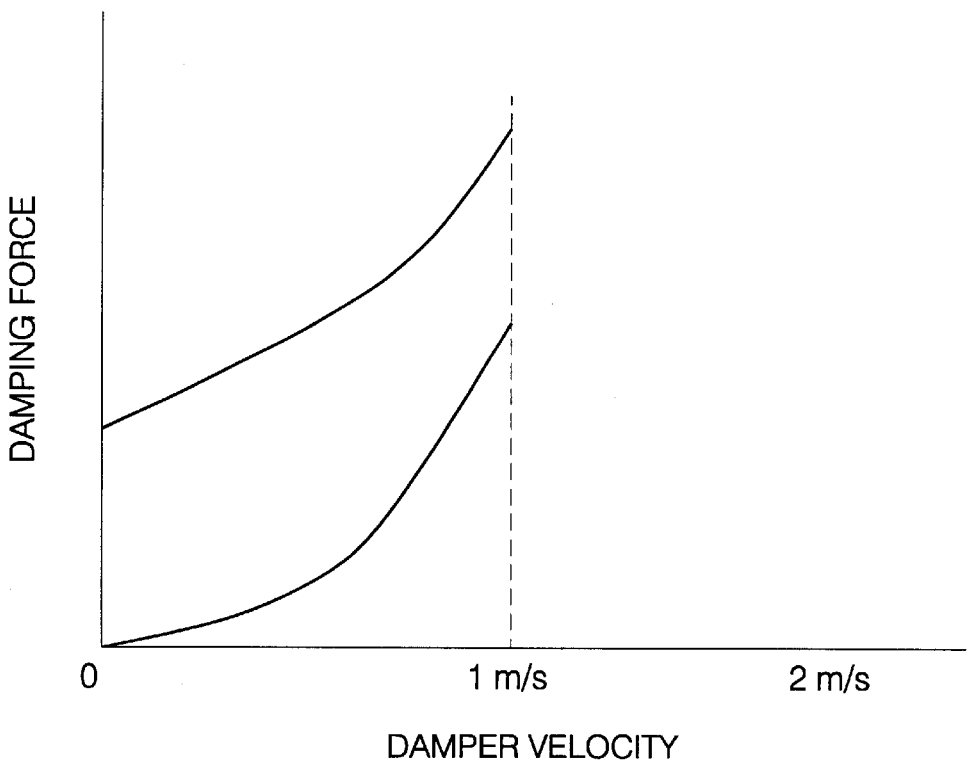
FIG. 3 is a graph of the relationship between damper force and damper velocity for the conventional MR damper of FIG. 2.
Figure 2:
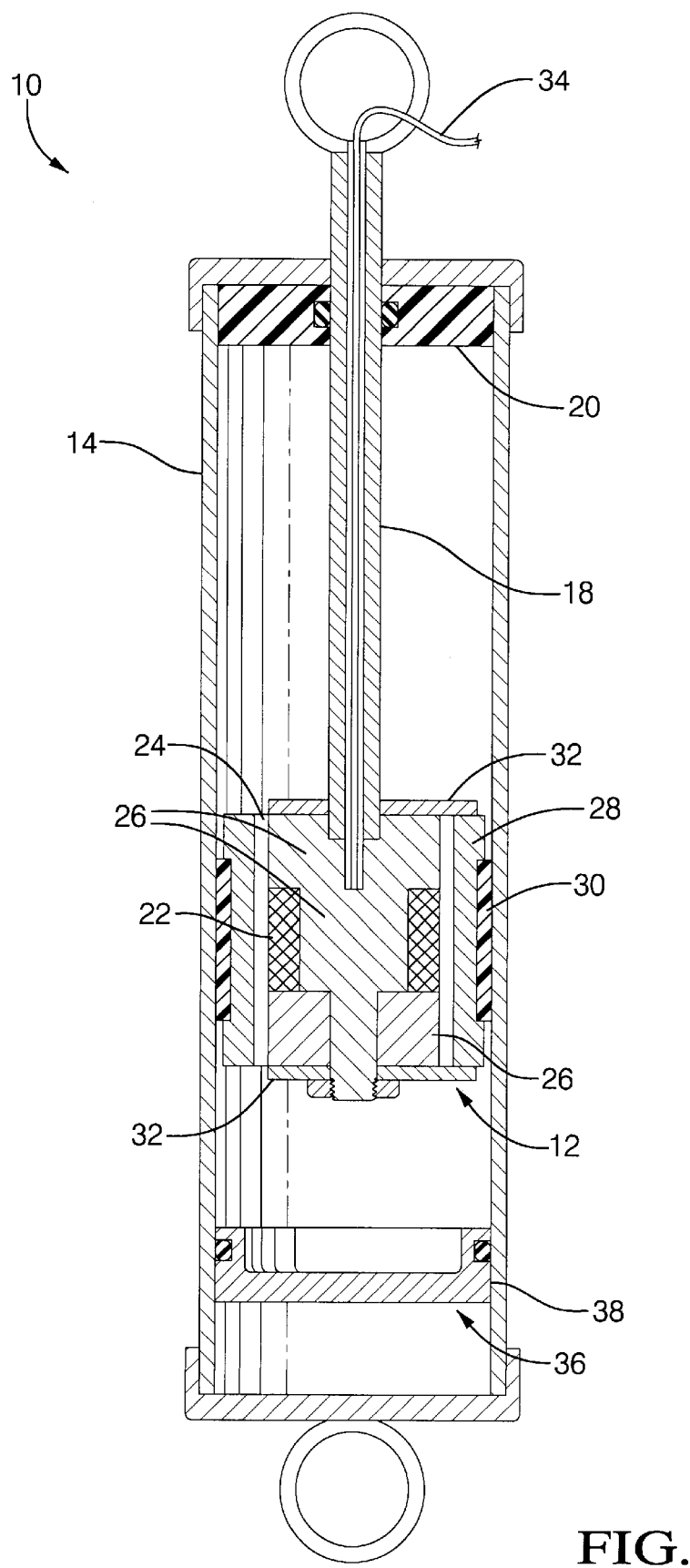
FIG. 2 is a cross-sectional view of a conventional MR damper.

Fundamentally, during damping, magnetorheological fluid present in one of the chambers of cylinder 102 flows through the plurality of substantially annular flow gaps 106 from, for example, second chamber 110 to first chamber 108 as piston assembly 104 moves to the left as shown in FIG. 4A. The magnetorheological fluid may be any conventional fluid including magnetic particles, such as iron or iron alloys, which can be controllably suspended within the fluid by controlling a magnetic field across the plurality of substantially annular flow gaps 106 thereby varying the flow characteristics of the fluid through flow gaps 106. The electrical current to coil 116 is variably controlled to vary the magnetic field and thus the magnetic flux in flow gaps 106 thereby controlling the flow characteristics of the magnetorheological fluid to achieve a desired damping affect for a given application. Importantly, the plurality of substantially annular flow gaps 106 function to provide an increased damping force when the damper is in the on-state (on-state force) thereby providing an enhanced tun-up ratio while permitting tuning of the force-velocity damping characteristics thereby optimizing damping and providing exceptional control of, for example, vehicle chassis dynamics. The MR damper of the present invention more closely approximates the ideal performance and force-velocity characteristics shown in FIG. 1 than the force-velocity characteristics of conventional MR damper designs as shown in FIG. 3.

Conventional MR damper designs assumed that the force generated in an MR damper in the off-state are strictly linear with velocity. However, this assumption is incorrect, especially at high damper velocities. It has been discovered that the off-state force ($F_{off}$) generated in a MR damper having concentric annular flow is given by:

$$F_{off}=(12\mu_0 A_{eff}^2 V_d h)/(A_g L_g^2)+xA_f(A_f-1)A_{eff}\rho V_d^y \tag{1}$$

where, $\mu_0$=MR Fluid viscosity $A_{eff}$=Effective cross sectional area of the piston (i.e., piston area-rod area)

$V_d$=damper velocity h=axial length of the annular flow gap $A_g$=cross sectional area of the annular flow gap $L_g$=radial length of the annular flow gap ($r_2-r_1$)

r=mean radius of the annular flow gap ($r_2+r_1$)/2

$r_2$=outer radius of the annular flow gap $r_1$=inner radius of the annular flow gap $A_f$=Amplification factor ($A_{eff}/A_g$)

$\rho$=density of the MR fluid x=dynamic flow coefficient (O<x<1.5)

y=dynamic flow coefficient (O<y<2.5)

The initial on-state force ($F_{init}$) at zero velocity is dependent on the yield stress of the MR fluid which in turn depends on the magnetic flux density in the annular flow gap. The initial on-state force is given by:

$$F_{init}=(2\tau_0 A_{eff} h_m)/(L_g) \tag{2}$$

where, $\tau_0$=MR Fluid yield stress (function of an operating flux density $B_g$)

$A_{eff}$=Effective cross sectional area of the piston (i.e., piston area-rod area)

$h_m$=active magnetic length of the annular flow gap $L_g$=radial length of the annular flow gap ($r_2-r_1$)

The total on-state force ($F_{on}$) at higher piston velocities $V_d$ can be approximated by:

$$F_{on}=F_{init}+F_{off} \tag{3}$$

From equations (1) and (3), the turn-up ratio (TU) at velocity $V_d$ is given by:

$$TU=(F_{init}/F_{off})+1 \tag{4}$$

Thus a larger turn-up ratio can be achieved with a reduction in $F_{off}$ and/or improving/increasing $F_{init}$.

The plurality of substantially annular flow gaps 106 functions to increase the turn-up ratio by increasing the initial on-state force $F_{init}$ and therefore the total on-state $F_{on}$. Specifically, the plurality of substantially annular flow gaps 106 effectively increase the damping force by increasing the total effective annular flow gap area of a conventional MR damper design. This increase in the annular flow gap area in the present damper is achieved without increasing the axial length of the annular flow gap and thus the length of the piston assembly by forming the plurality of annular flow gaps 106 positioned concentrically relative to one another. As a result, in the present design, a greater amount of fluid experiences the magnetorheological affect while flowing through a properly designed annular flow gap thereby increasing the damping force for a given piston length.

It has been discovered through mathematical analysis of the flow through the piston that, if a piston has n (n=2,3,4 . . . ) annular flow passages (gaps) each of radial length $$L'_g = \frac{1}{\sqrt{n}} L_g$$

and axial length $$h' = \frac{1}{\sqrt{n}} h$$

(where Lg and h are the corresponding dimensions of a conventional, single gap piston), then the n-gap piston performs substantially identically to the conventional single-gap piston. For n=2, this implies that a piston having two annular gaps each with a radial length of 0.707 Lg and axial length of 0.707 h is approximately 30% shorter in (piston) length while matching the performance of the the conventional single-gap piston. This has been demonstrated experimentally by the inventors. In the case of n=3, the piston length is reduced to 0.577 h on an equal performance basis.

Specifically, the plurality of substantially annular flow gaps 106 includes a first annular flow gap 130 formed between a first flux ring 132 and piston core 112. A second flux ring 134 is mounted concentrically around first flux ring 132 to form a second annular flow gap 136 positioned between second flux ring 134 and first flux ring 132. Although a dual flux ring and dual annular flow gap design has been demonstrated to be effective, the preferred embodiment of FIG. 4A may also include a third flux ring 138 positioned around, and spaced from, second flux ring 134 to form a third annular flow gap 140 positioned between third flux ring 138 and second flux ring 134. First, second and third flux rings 132, 134 and 138 are connected to piston core 112 and secured by a first end plate 142 and a second end plate 144 to prevent relative movement so as to maintain the precise radial length of each respective flow gap. Both first and second end plates 142 and 144 are sized to completely cover each respective end face of piston core 112 without hindering flow through the plurality of annular flow gaps 106. First and second end plates 142 and 144 include radial extensions 146 extending radially outward and spaced around the circumference of the respective plate for engaging the plurality of annular flux rings 120. Specifically, radial extensions 146 includes grooves 148 for receiving the ends of first, second and third flux rings 132, 134 and 138 so as to secure the flux rings in fixed axial and transverse positions to prevent relative movement thereby maintaining a desired transverse width, i.e., radial length $L_g$ in Eq. (1), of first, second and third annular flow gaps 130, 136 and 140. First end plate 142 also functions to maximize the magnetic field in the plurality of annular flow gaps 106 by minimizing leakage flux and thereby increasing the initial on-state force $F_{init}$ by functioning as a magnetic isolation barrier between piston core 112 and both rod 122 and cylinder 102. The advantageous manner in which first end plate 142 is designed and functions as a magnetic flux leakage reduction device is discussed in detail in co-pending U.S. patent application Ser. No. 09/394,487 entitled Magnetorheological Fluid Damper With Optimum Damping assigned to the assignee of the present invention and filed on the same day as the filing of the present application and the entire contents of which is hereby incorporated by reference. Generally, first end plate 142 functions to reduce magnetic flux leakage by completely covering the end face of piston core 112, by being formed of a non-magnetic material and by being positioned between rod 122 and piston core 112 so as to isolate rod 122. First end plate 142 also functions to maximize flux production by permitting rod 122 to be connected to piston assembly 104 without direct rod intrusion into piston core 112 thereby maximizing the magnetic material of the core. Second end plate 144 also effectively functions as a magnetic flux leakage reduction device while securing flux pole pieces 118 and plurality of annular flux rings 120 in position. Specifically, second end plate includes a flat plate 147 and a non-magnetic nut 149. The nut completes covers and threadably engages a threaded boss extending from piston core 112 thereby minimizing leakage from piston core 112. First and second end plates 142 and 144 may also include inner annular curved surfaces 150 for smoothly guiding fluid flow into and out of plurality of annular flow gaps 106 thereby enhancing lamninar flow and minimizing turbulence through the gaps thus optimizing the magnetorheological effect within the gaps as discussed more fully in co-pending U.S. patent application entitled Magnetorheological Fluid Damper With Optimum Damping noted hereinabove.

Alternatively, the plurality of annular flux rings 120 may be secured to piston core 112 by a respective corrugated insert positioned in each flow gap as disclosed in U.S. patent application Ser. No. 09/395,070 and entitled Magnetorheological Fluid Damper assigned to the assignee of the present application, filed on the same day as the filing of the present application and the entire contents of which is hereby incorporated by reference. If end plates are used to secure annular flux rings 120, then a generally smooth thin-walled cylindrically shaped insert may be mounted in one or more of the flow gaps to further enhance damping as disclosed in the aforementioned application Ser. No. 09/395,070. Also, first flux ring 132 and second flux ring 134 each include magnetic flux barriers formed of non-magnetic material and positioned annularly along a central portion of each of the flux rings. Magnetic flux barriers 152 function to prevent the lines of flux from traveling axially through first and second flux rings 132 and 134 without extending across third annular flow gap 140. By preventing this flux shunting, magnetic flux barriers 152 function to control the flux flow path to direct lines of flux through third annular flow gap 140 thereby ensuring a desired magnetorheological effect in third annular flow gap 140 and optimizing overall damping.

Figure 1:
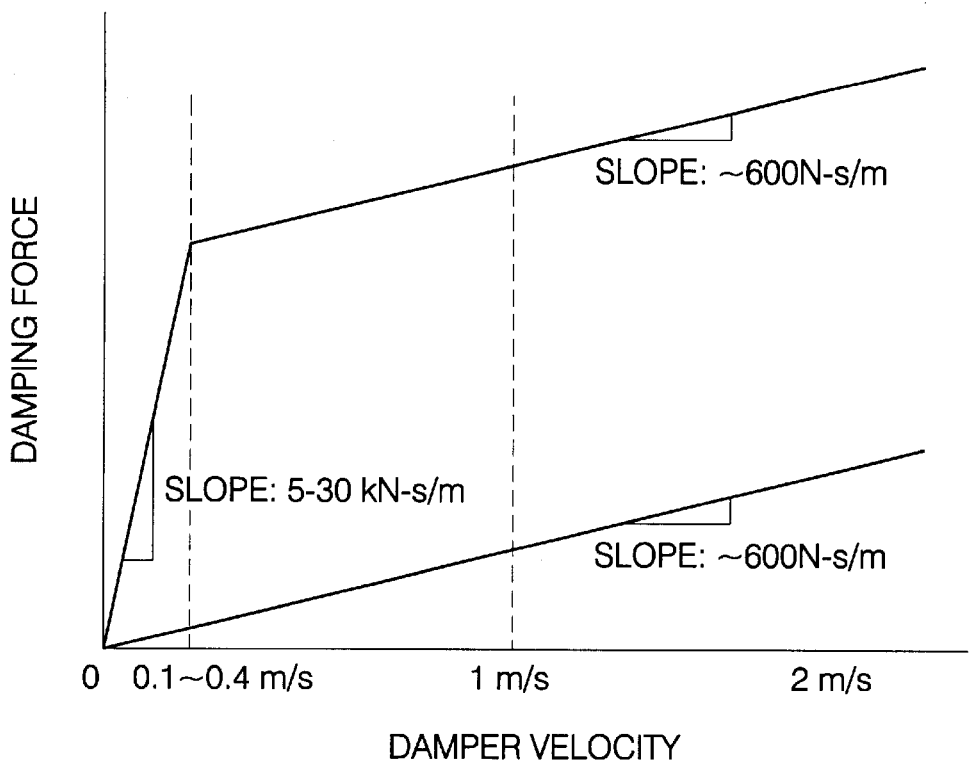
FIG. 1 is a graph showing the relationship between damping force and damper velocity for an ideal MR damper in an automotive application.

Damper 100 of the present invention utilizes the plurality of substantially annular flow gaps 106 to achieve several important advantages. First, as noted hereinabove, the increase in the total effective annular flow gap area using multiple flow gaps relative to a single gap damper results in a higher on-state force and thus a higher tun-up ratio resulting in improved damping over a single tube design for a given piston length. The term "annular flow gap area" in the previous sentence refers to the surface area of the walls within the annular flow gap across which the fluid flows. Thus, providing a second annular flow gap of the same axial length approximately doubles the annular flow gap area by providing two additional surfaces within the flow gap. Secondly, the multiple flow gap damper of the present invention permits a piston having a shorter length than a single gap damper piston while achieving the same force specification. As a result, the multiple flow gap damper of the present invention can significantly reduce piston length by, for example, 30% compared to single gap designs while providing a longer stroke which is advantageous in certain applications. Third, the multiple flow gap damper of the present invention results in better linearity during damping which more closely approximates the ideal performance requirements as shown in FIG. 1 by providing a greater number of design variables permitting enhanced tuning capability for controlling force-velocity curves, especially at low and mid-level velocities. For example, conventional single gap damper designs only permit the axial length and the radial length of the flow gap to be modified to control the force/velocity characteristics of the damper. Moreover, the control over the axial and/or radial length of the gap may be limited by packaging constraints. The multiple flow gap damper of the present invention permits the individual dimensions of the flow gaps to be tuned both individually and relative to one another creating numerous possibilities for setting the slope of the curves shown in FIG. 1. Consequently, the present damper enables design optimization for maximum turn-up ratio, improved linearity of damping force response (at higher piston velocities), and tuning (shaping) of the curves at low and medium piston velocities).

The multiple flow damper of the present invention also achieves optimized damping behavior near zero velocity as indicated in FIG. 1 thereby achieving stiction free behavior in the on-state to minimize harshness. This goal was achieved by forcing the force-velocity on-state curve to pass through zero. A linear force-velocity curve passing through zero is achieved by using laminar flow of the MR fluid through magnetically substantially neutral flow bypass channels extending through piston assembly 104. The initial slope of the force-velocity curve of FIG. 1 is controlled appropriately selecting the cross-sectional area of the bypass channels. For example, as shown in FIG. 4B, the bypass channels may include at least one of, and preferably both, multiple outer flow bypass channels 154 formed in third flux ring 138 and inner flow bypass channels 156 extending completely through piston assembly 104 and thus formed in piston core 112, and first and second end plates 142 and 144. Outer flow bypass channels 154 may be formed with a square or rectangular cross-section while inner flow bypass channels 156 may be formed with round or oval cross-section shapes. Thus, in the on-state, for initial velocities, the flow is substantially through bypass channels 154, 156 with a zero velocity resulting in zero force as the velocity increases substantially above zero, the pressure drop across the bypass channels exceeds the pressure drop due to the magnetorheological affect and the plurality of annular flow gaps 106 so that subsequent force characteristics depend on the magnetorheological characteristics through the flow gaps 106 and thus the dimensions of the flow gaps.

It should also be noted that damper 100 maximizes the active magnetic flux and thus $F_{init}$ by strategically positioning bearing 128. Specifically, bearing 128 is mounted on third flux ring 138 (or whichever is the outermost flux ring) so as to maximize the primary magnetic area in the center of flux ring 138 where the flux is concentrated. Preferably, as shown in FIG. 4A, bearing 128 is positioned at one end of third flux ring 138 axially along piston assembly 104 entirely between an axial center of piston core 112 and first chamber 108. However, alternatively, bearing 128 may be positioned to the left of center as shown in FIG. 4A. In either offset position, the primary magnetic area of third (or outermost) flux ring 138 is maximized to increase magnetic flux and ultimately the tun-up ratio.

What is claimed is:

1. A damper, comprising:

a cylinder containing a magnetorheological fluid; and a piston assembly slidably mounted for reciprocal movement in said cylinder to form a first chamber positioned on one side of said piston assembly and a second chamber positioned on an opposite side of said piston assembly, said piston assembly including a plurality of substantially annular flow gaps positioned concentrically to one another, each of said plurality of substantially annular flow gaps formed between opposing surfaces of magnetic material and open for substantially unrestricted flow therethrough in both directions between the first and second chambers, said piston assembly further including a magnet assembly adapted to generate a magnetic field extending through said plurality of substantially annular flow gaps to cause magnetorheological fluid flowing through said plurality of substantially annular flow gaps to experience a magnetorheological effect affecting the flow of the magnetorheological fluid through said plurality of substantially annular flow gaps.

2. The damper of claim 1, wherein said plurality of substantially annular flow gaps includes two substantially annular flow gaps.

3. The damper of claim 1, wherein said piston assembly further includes a plurality of annular flux rings positioned concentrically to form said plurality of substantially annular flow gaps.

4. The damper of claim 3, further including a first end plate secured to one end of said piston assembly and a second end plate secured to a second end of said piston assembly, said first and said second end plates formed of non-magnetic material and including radial extensions connected to said plurality of annular flux rings.

5. The damper of claim 4, wherein each of said radial extensions includes grooves for receiving said plurality of flux rings.

6. The damper of claim 3, wherein a central portion of each of said flux rings includes a magnetic flux barrier formed of a non-magnetic material.

7. The damper of claim 1, wherein said piston assembly further includes a piston bearing mounted on said piston assembly and positioned axially along said piston assembly entirely between an axial center of said piston assembly and one of said first and said second chambers.

8. The damper of claim 1, wherein said piston assembly further includes a piston core and a non-magnetic end plate connected to said piston assembly, further including a rod connected to said non-magnetic end plate, said non-magnetic end plate axially positioned between said rod and said piston core to isolate and position said rod a spaced axial distance from said piston core.

9. A damper, comprising:

a cylinder containing a magnetorheological fluid; and a piston assembly slidably mounted for reciprocal movement in said cylinder to form a first chamber positioned on one side of said piston assembly and a second chamber positioned on an opposite side of said piston assembly, said piston assembly including a piston core and a magnet assembly adapted to generate a magnetic field, said magnet assembly including a first flux ring positioned concentrically around said piston core to form a first annular flow gap positioned radially between said piston core and said first flux ring, said magnet assembly further including a second flux ring positioned concentrically around said first flux ring to form a second annular flow gap positioned radially between said first flux ring and said second flux ring, said first and said second annular flow gaps being open for substantially unrestricted flow therethrough in both directions between the first and second chambers and sized to permit magnetorheological fluid flowing through said first and said second annular flow gaps to experience a magnetorheological effect affecting the flow of the magnetorheological fluid through said first and said second annular flow gaps.

10. The damper of claim 9, wherein said magnet assembly further includes a third flux ring positioned concentrically around said second flux ring to form a third annular flow gap positioned radially between said second flux ring and said third flux ring.

11. The damper of claim 9, further including a first end plate secured to a first end of said piston assembly and a second end plate secured to a second end of said piston assembly, said first and said second end plates formed of non-magnetic material and including radial extensions connected to said first and said second annular flux rings.

12. The damper of claim 11, wherein each of said radial extensions includes grooves for receiving each of said first and said second flux rings.

13. The damper of claim 9, wherein a central portion of each of said first and said second flux rings includes a magnetic flux barrier formed of a non-magnetic material.

14. The damper of claim 9, wherein said piston assembly further includes a piston bearing mounted on said piston assembly and positioned axially along said piston assembly entirely between an axial center of said piston assembly and one of said first and said second chambers.

15. The damper of claim 9, wherein said piston assembly further includes a non-magnetic end plate connected to said piston assembly, further including a rod connected to said non-magnetic end plate, said non-magnetic end plate axially positioned between said rod and said piston core to isolate and position said rod a spaced axial distance from said piston core.

16. A damper, comprising:
a cylinder containing a magnetorheological fluid; and
a piston assembly slidably mounted for reciprocal movement in said cylinder to form a first chamber positioned on one side of said piston assembly and a second chamber positioned on an opposite side of said piston assembly, said piston assembly including a plurality of annular flux rings positioned concentrically to form a plurality of substantially annular flow gaps positioned concentrically to one another, each of said plurality of substantially annular flow gaps formed between opposing surfaces of magnetic material, said piston assembly further including a magnet assembly adapted to generate a magnetic field extending through said plurality of substantially annular flow gaps to cause magnetorheological fluid flowing through said plurality of substantially annular flow gaps to experience a magnetorheological effect affecting the flow of the magnetorheological fluid through said plurality of substantially annular flow gaps, wherein a central portion of each of said flux rings includes a magnetic flux barrier formed of a non-magnetic material.

17. A damper, comprising:
a cylinder containing a magnetorheological fluid; and
a piston assembly slidably mounted for reciprocal movement in said cylinder to form a first chamber positioned on one side of said piston assembly and a second chamber positioned on an opposite side of said piston assembly, said piston assembly including a piston core and a magnet assembly adapted to generate a magnetic field, said magnet assembly including a first flux ring positioned concentrically around said piston core to form a first annular flow gap positioned radially between said piston core and said first flux ring, said magnet assembly further including a second flux ring positioned concentrically around said first flux ring to form a second annular flow gap positioned radially between said first flux ring and said second flux ring, said first and said second annular flow gaps sized to permit magnetorheological fluid flowing through said first and said second annular flow gaps to experience a magnetorheological effect affecting the flow of the magnetorheological fluid through said first and said second annular flow gaps, wherein a central portion of each of said first and said second flux rings includes a magnetic flux barrier formed of a non-magnetic material.

* * * * *